Nov. 15, 1955

J. C. ADAMS 2,723,841

CARBURETOR OR FUEL ATOMIZING DEVICE
FOR INTERNAL COMBUSTION ENGINES

Filed Jan. 23, 1953

INVENTOR
Joseph C. Adams
BY James Arkins
ATTORNEY

INVENTOR
Joseph C. Adams

ATTORNEY

United States Patent Office 2,723,841
Patented Nov. 15, 1955

2,723,841

CARBURETOR OR FUEL ATOMIZING DEVICE FOR INTERNAL COMBUSTION ENGINES

Joseph C. Adams, Riverside, Calif.

Application January 23, 1953, Serial No. 332,906

6 Claims. (Cl. 261—30)

This invention relates to improvements in a carburetor or fuel atomizing device for internal combustion engines.

An object of the invention is to provide a fuel atomizing device for engines of the internal combustion type by the use of which the power of such engines is substantially increased with a reduced consumption of fuel thereby.

A further object of the invention is to provide a fuel atomizing device in the form of a supercharging evaporator and which is operative by a motor in turn operated by current generated by the engine with which the evaporator may be operatively associated.

A still further object of the invention is to provide a fuel atomizing device of the character above referred to which is substantially compact in form and which is adapted to provide maximum power in an engine with which it may be operatively associated by the use of a minimum volume of fuel.

Other objects and advantages of the invention will become apparent in the course of the following detailed description taken in connection with the accompanying drawings wherein.

Figure 1:
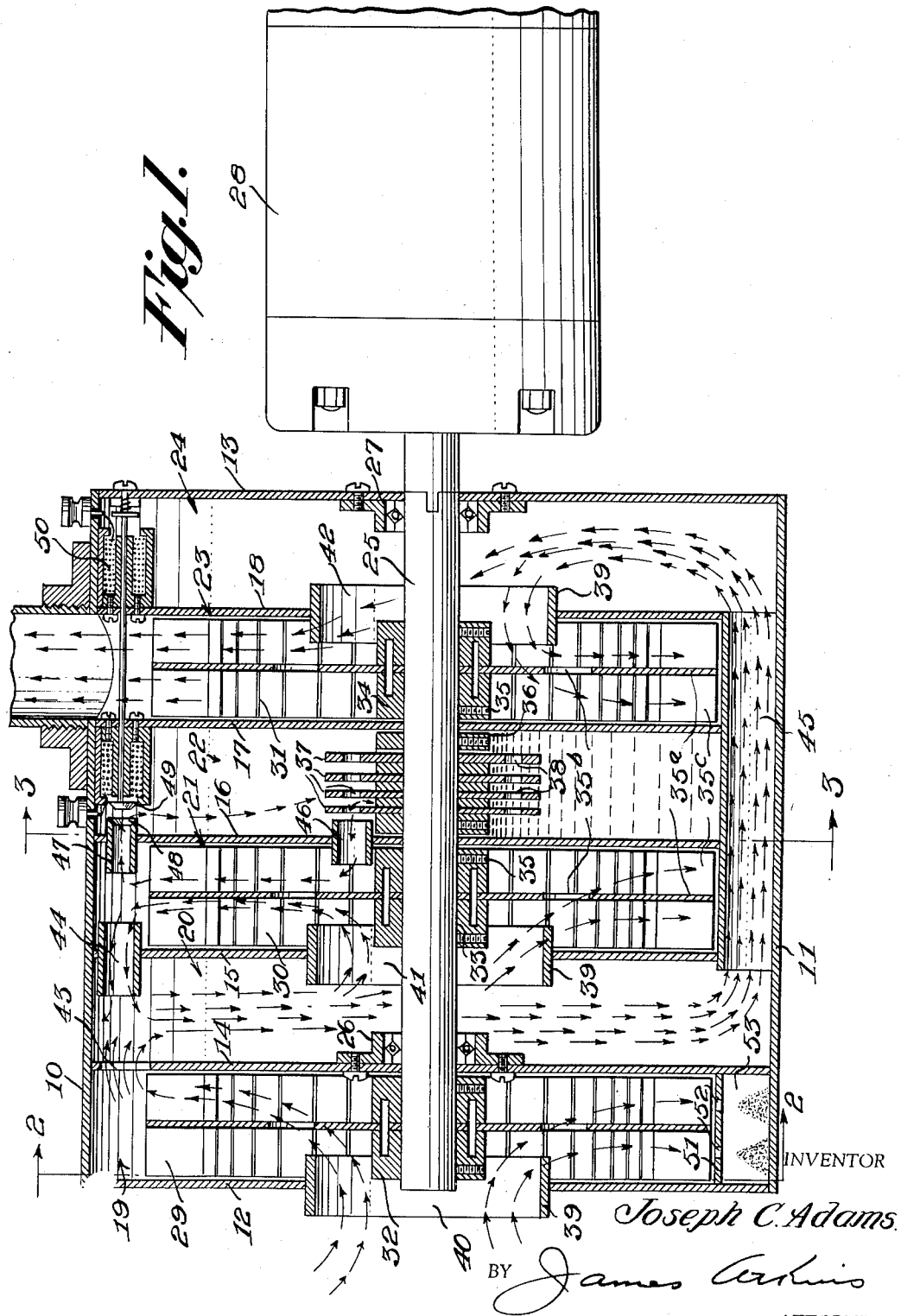
Fig. 1 is a vertical longitudinal section view of the improved carburetor or fuel atomizing device constructed in accordance with a preferred structural embodiment of the invention.
Figure 2:
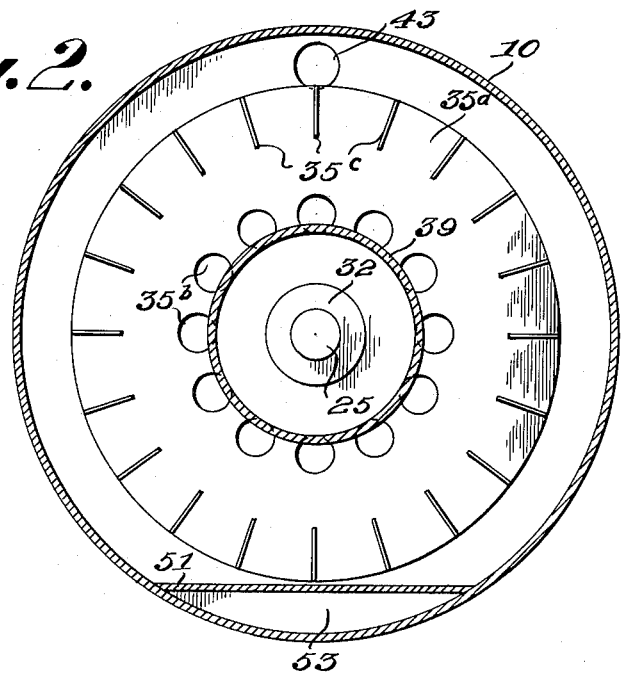
Fig. 2 is a vertical transverse section view in the plane of line 2—2 on Fig. 1.
Figure 3:
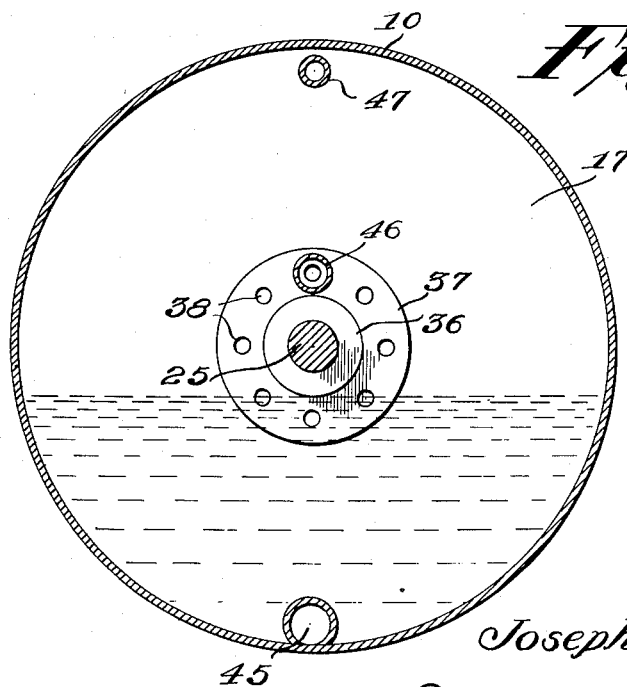
Fig. 3 is a vertical transverse sectional view in the plane of line 3—3 on Fig. 1.

Referring now in detail to the drawings, 10 designates the generally cylindrical casing of the improved device and which is adapted for operative connection with an internal combustion engine.

The casing 10 includes the generally cylindrical wall 11, opposite end walls 12 and 13, and intermediate partition walls 14, 15, 16, 17 and 18 which are parallel with the end walls 12 and 13 and which with the end walls are substantially equally spaced.

The end walls 12 and 13 in cooperation with the partition walls 14 to 18 provide chambers 19, 20, 21, 22, 23 and 24, respectively.

A shaft 25 extends axially of the casing 10 and is rotatably journaled in bearings 26 and 27 supported by the walls 14 and 13, respectively.

The shaft is operatively connected with an electric motor 28 of the low voltage direct current type and which is adapted for operation by current generated by the internal combustion engine.

Rotatably supported within the respective chambers 19, 21 and 23 are centrifugal fans 29, 30 and 31 whose respective hubs 32, 33 and 34 are rigidly connected with the shaft as by means of set screws 35.

As indicated, each fan 29, 30 and 31 includes a central disk 35ª which disk is provided with a circumferential series of air flow apertures 35ᵇ, and a circumferential series of blades 35ᶜ is supported by the disk 35ª at each side thereof.

A rotor 36 is disposed within the chamber 22 and is rigidly secured to the shaft 25. The rotor 36 includes axially spaced disks 37 which are provided with a series of circumferentially spaced apertures 38.

The end wall 12 and partition walls 15 and 18 are each provided with a cylindrical wall 39 in concentric relation to shaft 25 and which provide ports 40, 41 and 42, respectively.

The partition wall 14 is provided with a port 43 substantially in the vertical axial plane thereof, and the partition wall 15 is provided with an elongated port 44 in substantial axial alinement with the port 43.

An elongated port 45 is provided at the lower side of the casing 10 and which is in communication with chambers 20 and 24.

The partition wall 16 is provided with a port 46 whose axis is parallel to shaft 25 and which is disposed in alinement with the axes of apertures 38 in the disks 37.

The partition wall 16 is further provided with a port 47 whose one end is provided with a valve seat 48 cooperating with the throttle valve 49 which is magnetically actuated by the solenoid 50.

A horizontal partition 51 is disposed within the base of chamber 19 and is provided with apertures 52 and which provides a dirt-collecting receptacle 53.

Having set forth the construction of the improved atomizing device, the operation thereof is as follows:

With the motor 28 set into operation, rotation is imparted to the shaft 25 and which in turn imparts rotation to the three fans 29, 30, and 31 and also to the rotor 36.

The port 40 provides the initial air intake and the adjacent centrifugal fan 29 operates as a pressure booster. The air entering chamber 19 will be circulated therein and any dirt admitted with the initial air will fall through the apertures 52 and into the collecting receptacle 53.

As indicated by the arrows in Fig. 1, the air initially admitted into chamber 19 will be forced by the fan 29 through the port 43 in partition 14. The air, as indicated by the arrows, will then take different courses, one volume of which will enter the port 41 and another volume of which will pass through the elongated port 45. The volume of air passing through port 41 will enter the fan 30, which may be considered as the mixer fan for the reason that the volume of air passing therethrough will be mixed with the fuel in chamber 22.

The apertured disks 37 have their lower portions constantly immersed in a liquid fuel supply, as indicated in Fig. 1, and which disks in their rotation by the shaft 25 deliver liquid fuel to the action of the air stream indicated in Fig. 1 by the arrows as passing through the port 47, and the resulting liquid fuel and air mixture or vapor fuel passes through the port 46 into chamber 21 for recirculation.

Since the performance and efficiency of an engine are dependent upon the relative proportions of liquid fuel and air in a vapor fuel entering the intake manifold, it is the purpose of the valve 49 to vary the volume of air entering chamber 22 through the port 47, and the valve-actuating solenoid is accordingly manually controlled by an operator in accordance with the speed requirements of the engine.

While a portion of the air only which is forced into chamber 20 is circulated through fan 30, such air is constantly re-circulated, as indicated by the arrows, for mixture with the fuel vapor and is eventually passed through the port 45 and into the chamber 24. The air entering the chamber 24 is a fuel mixture for the engine, and such air is drawn through the port 42 and into the centrifugal fan 31 which acts as a pressure booster and by which the fuel mixture is delivered to the intake manifold of the engine.

While I have disclosed rotary disks as a practical means for presenting fuel-wetted surfaces to the action of the evaporator, other means for this purpose may be used within the scope of the invention. As an example of such other means, wicks may be disposed within the chamber 22 and so positioned that portions thereof are constantly immersed in the liquid fuel and other portions thereof are exposed to the action of the evaporator.

The action of the wicks would be to deliver fuel by capillary action, and the said other wetted portions thereof disposed in approximately the position of the upper portions of the disks 37.

In the use of the rotary disks as disclosed, wicks may be immersed in the fuel in the chamber 22 in such position that they would bear on the disks for the sole purpose of preventing splashing of the liquid fuel upon rotation of the disks therein.

Having set forth my invention in accordance with a preferred structural embodiment thereof, what I claim and desire to secure by U. S. Letters Patent is:

1. A fuel atomizer comprising a cylindrical casing having end walls, a motor driven shaft extending axially within said casing, partitions parallel with said end walls and therewith providing a plurality of chambers within the casing, an initial air intake port in one end wall to one of said chambers, a pressure booster fan on said shaft in said one chamber, a fuel mixing fan on said shaft in a second of said chambers spaced from said one chamber by a mixing chamber, a fuel tank in a third chamber adjacent said second chamber, a port connecting said one chamber and said mixing chamber for conducting air exhausted by said booster fan from said one chamber into said mixing chamber, inlet and outlet ports connecting said mixing chamber and said second chamber permitting circulation of gas by said mixing fan between said mixing chamber and said second chamber, a port connecting said third chamber and said second chamber for conducting vaporized fumes from said third chamber to said second chamber to be mixed with air by said mixing fan, a fuel evaporator in said third chamber vaporizing fuel from said tank, and a second booster fan for exhausting the fuel mixture through an outlet from said mixing chamber.

2. A fuel atomizer as defined in claim 1, wherein the fuel evaporator comprises a plurality of spaced discs on said shaft partially immersed in the fuel in said tank for dispersing fuel in the third chamber for evaporation by air circulated therein.

3. A fuel atomizer as defined in claim 2, wherein said discs are provided with holes for transferring fuel from the tank to disperse it in the air in the third chamber.

4. A fuel atomizer as defined in claim 1, wherein said second booster fan is arranged in a fourth chamber at the other end of said casing on the opposite end of said third chamber from said second chamber.

5. A fuel atomizer as defined in claim 1, wherein said intake port and said inlet port surround said shaft.

6. A fuel atomizer as defined in claim 1, wherein a dirt-collecting receptacle is provided at the bottom of said first chamber for receiving dirt discharged from the air by said booster fan.

References Cited in the file of this patent
UNITED STATES PATENTS

| | | |
|---|---|---|
| 165,564 | Gray et al. | July 13, 1875 |
| 206,736 | Kirkham et al. | Aug. 6, 1878 |
| 261,551 | Isbell | July 25, 1882 |
| 574,683 | Holmes | Jan. 5, 1897 |